(12) United States Patent
Graff et al.

(10) Patent No.: US 7,916,988 B2
(45) Date of Patent: Mar. 29, 2011

(54) OPTICAL SPLITTER ASSEMBLY

(75) Inventors: Ludwig C. Graff, Ellicott City, MD (US); Vijay Jain, Columbia, MD (US)

(73) Assignee: Verizon Services Corp., Ashburn, VA (US)

( * ) Notice: Subject to any disclaimer, the term of this patent is extended or adjusted under 35 U.S.C. 154(b) by 0 days.

(21) Appl. No.: 11/615,551

(22) Filed: Dec. 22, 2006

(65) Prior Publication Data
US 2008/0152291 A1 Jun. 26, 2008

(51) Int. Cl.
*G02B 6/26* (2006.01)
(52) U.S. Cl. .......................... 385/48; 385/148
(58) Field of Classification Search ............... 385/48, 385/24, 17, 22, 28, 134, 135
See application file for complete search history.

(56) References Cited

U.S. PATENT DOCUMENTS

| 5,809,190 | A  | * | 9/1998 | Chen ............................. 385/43 |
| 7,457,503 | B2 | * | 11/2008 | Solheid et al. ............... 385/135 |
| 2003/0174996 | A1 | * | 9/2003 | Henschel et al. ............ 385/135 |
| 2003/0202529 | A1 | * | 10/2003 | Jarett ........................... 370/437 |
| 2004/0141692 | A1 |   | 7/2004 | Anderson et al. |
| 2005/0074203 | A1 | * | 4/2005 | Marion ......................... 385/24 |
| 2005/0129379 | A1 | * | 6/2005 | Reagan et al. ............... 385/135 |
| 2005/0265683 | A1 | * | 12/2005 | Cianciotto et al. .......... 385/146 |
| 2006/0269204 | A1 | * | 11/2006 | Barth et al. .................. 385/135 |
| 2007/0207186 | A1 | * | 9/2007 | Scanlon et al. .............. 424/424 |
| 2008/0019655 | A1 | * | 1/2008 | Vongseng et al. ........... 385/135 |
| 2008/0025684 | A1 | * | 1/2008 | Vongseng et al. ........... 385/135 |
| 2008/0063351 | A1 | * | 3/2008 | Elkins et al. ................. 385/138 |
| 2008/0124038 | A1 | * | 5/2008 | Kowalczyk et al. ......... 385/135 |
| 2008/0138026 | A1 | * | 6/2008 | Yow et al. .................... 385/137 |

* cited by examiner

*Primary Examiner* — Ellen Kim

(57) ABSTRACT

Optical splitter assemblies are provided. An assembly may include a housing, one or more fanout elements, an optical splitter element, an input fiber and a plurality of output fibers. The input fiber extends from an input opening of the housing to the optical splitter element. The input fiber carries an input signal to the optical splitter element and the optical splitter element splits the input signal into a plurality of output signals to be carried by the plurality of output fibers. Each of the output fibers extends from the optical splitter element to beyond a plurality of output openings of the housing. Each of the fanout elements defines one or more channels for supporting the input or output fibers. The assembly may further include tubular members for further support to the fibers. The fibers extend from the openings of the housing to the optical splitter element free of any loops.

19 Claims, 3 Drawing Sheets

OPTICAL SPLITTER ASSEMBLY

BACKGROUND INFORMATION

Optical splitters are used in fiber distribution hubs of fiber to the premises ("FTTP") networks. An optical splitter device is configured to split an incoming optical signal input into 16 or 32 optical signal outputs. The outputs are connected through a fiber optic patch panel to the distribution fibers that are dropped at the individual premises of the network. Typically, the optical signal outputs are looped at least once between the optical splitter and the fiber optic patch panel. The size of the loop varies depending on the type of fiber of the optical signal outputs.

An optical splitter and the optical signal outputs extending from the optical splitter are housed at least partially within a cassette or assembly, which in turn forms part of a fiber distribution hub. The overall size of the assemblies varies between vendors and is usually relatively large compared to the actual optical splitter. The variation and overall size of the assemblies may be attributed to the size of the fiber loop. And the variation and overall size of the assemblies may add to the complexity and overall size of the fiber distribution hub.

BRIEF DESCRIPTION OF THE SEVERAL VIEWS OF THE DRAWING(S)

DETAILED DESCRIPTION OF SELECTED PREFERRED EMBODIMENTS

Exemplary embodiments are described hereinafter with reference to the accompanying drawings, in which exemplary embodiments and examples are shown. Like numbers refer to like elements throughout.

Figure 1:
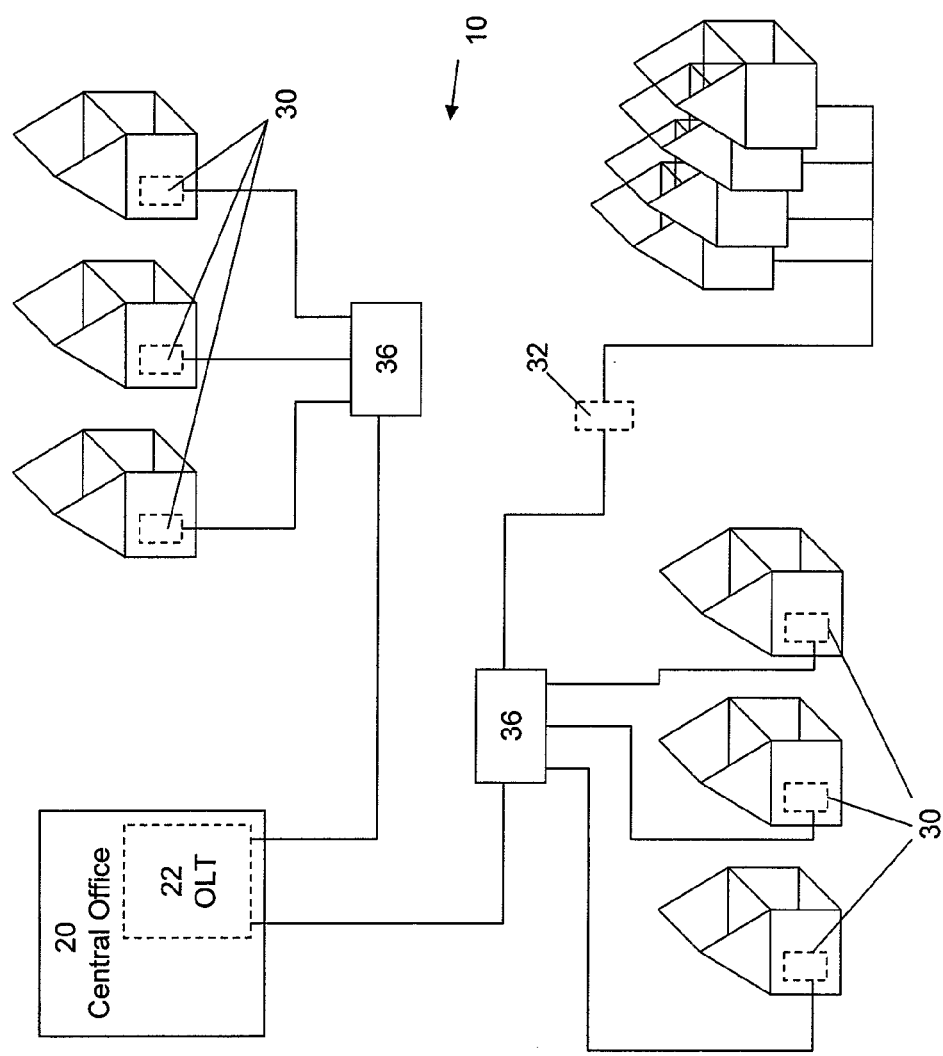
FIG. 1 is a block diagram of an optical fiber network consistent with exemplary embodiments.

Exemplary embodiments relate to an optical splitter assembly. In general, the optical splitter assembly includes a housing for an optical splitter element configured to split at least one input optical signal into a plurality of output optical signals. Exemplary embodiments may be part of various devices or systems within an optical fiber network. For example, the optical splitter assembly described herein may be part of a fiber to the premises (FTTP), also referred to as fiber to the home (FTTH), system using passive optical networks. As illustrated in FIG. 1, a FTTP system may include or otherwise be in communication with a provider's central office 20 that delivers optical signals to a plurality of subscribers through a passive optical network or PON 10. The passive optical network may 10 include an optical line terminal (OLT) 22 at the provider's central office and a plurality of optical network terminals (ONTs) 30 located at the premises of the subscribers, e.g. a costumer home. The passive optical network may also include one or more optical network units (ONUs) 32 that function as gateways to additional sub-networks associated with other systems, such as fiber to the curb (FTTC) and fiber to the neighborhood (FTTN) systems. The OLT 22 can be connected to the ONTs 30 and ONUs 32 through a series of fiber links 34 and one or more fiber distribution hubs 36.

Figure 2:
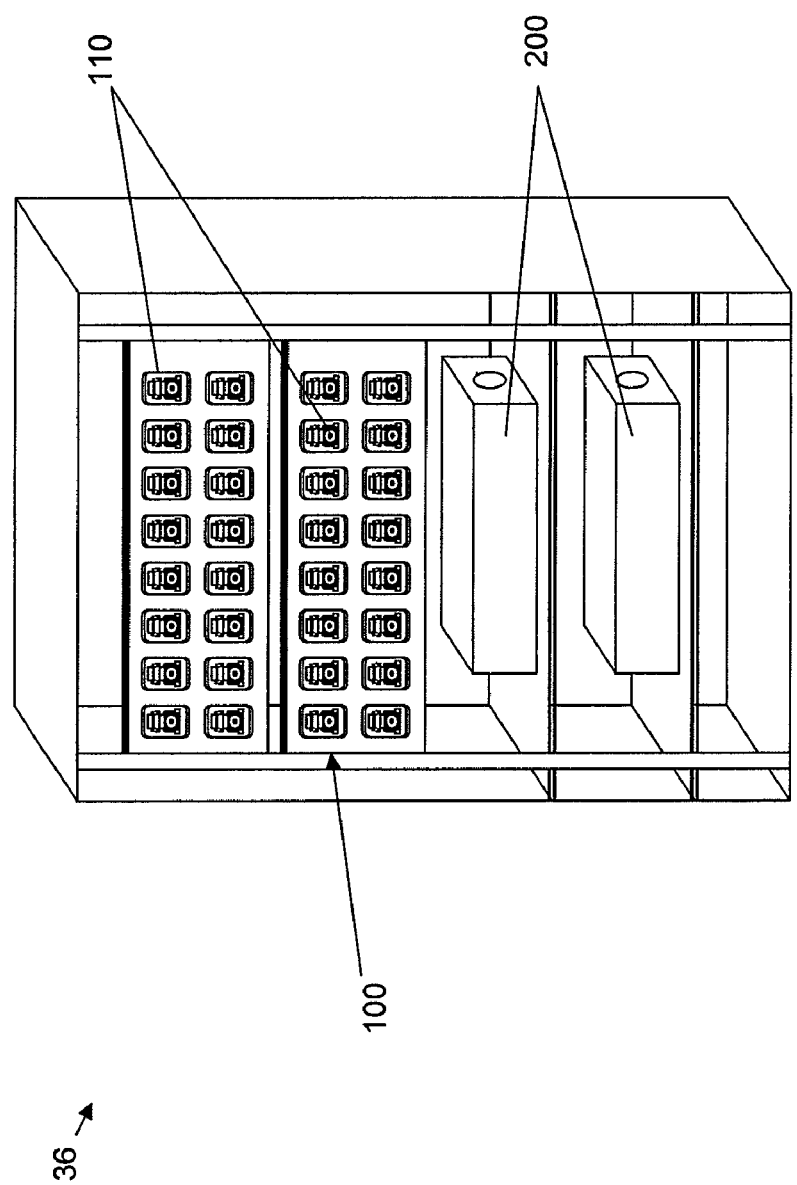
FIG. 2 is a block diagram of a fiber distribution hub consistent with exemplary embodiments.

More specifically, as illustrated in FIG. 2, a fiber distribution hub 36 is configured to house at least one optical patch panel 100 and at least one optical splitter assembly 200. As further described below, the optical splitter assembly is configured to receive an input optical fiber or ribbon carrying an optical signal and split the optical signal among a plurality of output optical fibers or ribbons. The optical patch panel 100 includes a plurality of input adapters 110 that are in communication with distribution cables leading to the ONTs or OLTs. The adapters 110 of the optical patch panel are configured to receive the output optical fibers. Consequently, a particular optical signal can be sent to a particular ONT or OLT by connecting the appropriate output optical fiber to the input adapter in communication with that ONT or OLT via a respective distribution cable.

Figure 3:
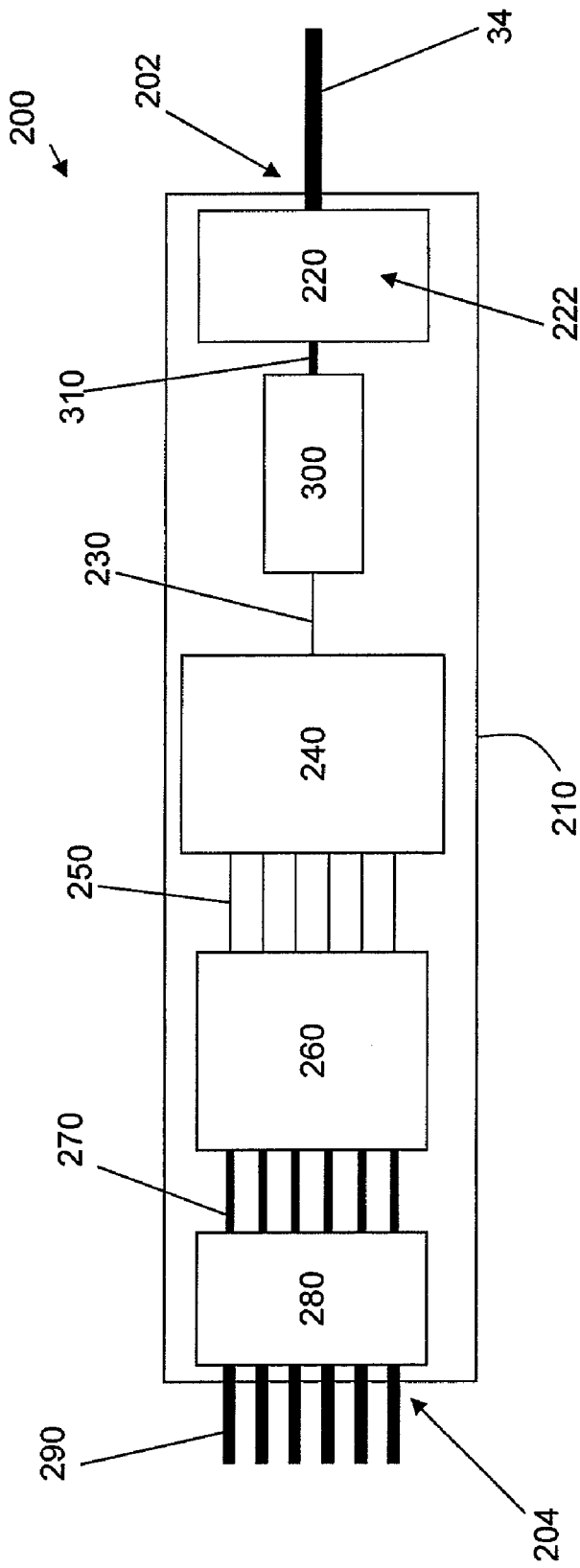
FIG. 3 is a simplified block diagram of an optical splitter assembly according to an exemplary embodiment.

FIG. 3 illustrates an exemplary embodiment of an optical splitter assembly 200. The assembly 200 may include a housing 210, an input adapter 220, an input fiber 230, an optical splitter element 240, a plurality of output fibers 250, a first fanout element 260, a first plurality of tubular members 270, a second fanout element 280, and a second plurality of tubular members 290.

The housing 210 generally provides an internal space in which to support the optical splitter element 240 and the first and second fanout elements 260, 280. The housing 210 defines at least a first input opening 202 and a plurality of output openings 204. Other embodiments may define additional openings. Indeed, the housing 210 according to some embodiments may not extend completely around one or all of the elements of the assembly 210. In other words, the housing may vary beyond the embodiments described herein, and include any housing that is generally configured to support the optical splitter element 240 and the first and second fanout elements 260, 280 and define at least a first input opening and a plurality of output openings.

The input adapter 220 is configured to receive or otherwise be in communication with a fiber cable 34 carrying an optical signal. The fiber cable 34 may extend from the OLT, another fiber distribution hub, or from another element of the fiber optic network, such as an optical amplifier. The adapter 220 may be at least partially supported by or attached to the input opening 202 defined by the housing 210. The adapter 220 may define a port or an orifice for receiving a plug-connector attached to an end of the fiber cable. And/or the adapter 220 may include a fanout element 222 having a first end and a second end and defining a channel extending between the first and second ends. An outer sheath or an outer tubular member of the fiber cable may extend and be attached to the first end of the fanout element 222 of the input adapter. An input fiber of the fiber cable may extend through the channel and beyond the second end of the fanout assembly 222 of the input adapter.

The input fiber 230 extends from at least the input adapter 220 to the optical splitter element 240. The input fiber 230 of the assembly may be an extension of a fiber of the fiber cable 34 leading to the optical splitter assembly 200 or may be a discrete portion of fiber beginning at a first end from the input adapter 220.

The optical splitter element 240 includes a first or input end and a second or output end. The first end of the optical splitter element 240 is in communication with the second end of the input fiber 230. For example, the optical splitter element 240 may define at least a first input port at the first end for receiving the second end of the input fiber 230. And/or the second end of the input fiber 230 may be fused to the optical splitter element 240. The optical splitter element 240 is configured to split the optical signal carried through the input fiber 230 into a plurality of optical signals to be carried through the plurality of output fibers 250. For example, the optical splitter element 240 may be a 1×16 or a 1×32 splitter, i.e. the optical splitter element 240 may split the one input optical signal into 16 or 32 output optical signals. The second end of the optical splitter element 240 is in communication with the plurality of output fibers 250. For example, the optical splitter element 240 may define a plurality of output ports at the second end of the optical splitter element 240 for receiving the first ends of the plurality of output fibers 250. And/or the first ends of the plurality of output fibers 250 may be fused to the second end of the optical splitter element 240. The structure of the optical splitter element 240 may vary. For example, the optical splitter element 240 may be a planar light wave circuit or PLC chip or any other device or structure configured to split the input optical signals into multiple output optical signals.

Each of the plurality of output fibers 250 extend from the first end of the output fiber 250 in communication with the second end of the optical splitter element 240 to a second end of the output fiber 250. In general, each output fiber 250 is configured to carry a split output optical signal from the optical splitter element 240. The number of the output fibers 250 may vary. For example, the number of output fibers 250 may be based on the configuration of the optical splitter element 240, i.e. the number of output signals. More specifically, in the examples provided above, the number of output fibers 250 may be 16 or 32. As explained below, each output fiber 250 extends through the first and second fanout elements 260, 280 and an output opening 204 defined by the housing 210 and the second end of each output fiber 250 extends beyond the housing 210 of the optical splitter assembly 200. Moreover, as illustrated in FIG. 3, each of the output fibers 250 may extend from the optical splitter assembly 240 to an output opening 204 free of loops.

The first fanout element 260 may have a plurality of input ports and output ports and define a plurality of channels extending between the plurality of input ports and output ports. Each output fiber 250 may extend into one of the input ports, along and within one of the channels, and beyond one of the output ports of the first fanout element 260.

Each tubular member of the first plurality of tubular members 270 may extend from a first end at or near one of the plurality of output ports of the first fanout element 260 to a second end. Each output fiber 250 may extend into a first end of one of the tubular members 270, along and within the tubular member 270 or outer sheath, and beyond the second end of the tubular member 270. Each first end of the tubular members 270 may be attached to one of the output ports of the first fanout element 260. For example, each of the first ends of the tubular members 270 may be attached to one of the output ports of the first fanout element 270 by an epoxy.

The second fanout element 280 may have a plurality of input ports and output ports and define a plurality of channels extending between the plurality of input ports and output ports. Each output fiber 250 may extend into one of the input ports, along and within one of the channels, and beyond one of the output ports of the second fanout element 280.

Each tubular member of the second plurality of tubular members 290 may extend from a first end at one of the plurality of output ports of the second fanout element 280 to a second end. Each output fiber 250 may extend into a first end of the one of the tubular members 290, along and within the tubular member 290 or outer sheath, and beyond the second end of the tubular member 290. Each first end of the tubular members 290 may be attached to one of the output ports of the second fanout element 280. For example, each of the first ends of the tubular members 290 may be attached to one of the output ports of the first fanout element 290 by an epoxy.

As stated above, the second end of each of the output fibers 250 extends beyond an output opening defined by the housing 210. For example, in one exemplary embodiment, each of the output fiber 250 along with a tubular member of the second plurality of tubular members may extend beyond an output opening and to an optical patch panel defining a plurality of adapters. In particular, at least the second end of the output fiber may be receivable by an adapter of the optical patch panel. Or the second end of the output fiber and the tubular member of the second plurality of the tubular members may be connectorized, such that a plug is attached to at least the second end of the output fiber and the plug is receivable by an adapter of the optical patch panel. For example, the plug may be a LC-APC plug as further disclosed in U.S. Patent Application, entitled Fiber Distribution Hub Assembly, assigned to the same assignee as the present application, and filed the same day as the present application, and hereby incorporated in its entirely by reference.

As illustrated in FIG. 3, the assembly 200 may further include a third fanout assembly 300. The third fanout assembly 300 may be positioned between the optical splitter element 240 and the input adapter 220 of the assembly. The third fanout assembly 300 may include an input port and an output port and define a channel extending between the input and output ports. The input optical fiber 230 may extend along and through the channel.

The assembly 200 may also include a tubular member 310 or outer sheath extending from a first end at or near the input adapter 220 to a second end at or near the third fanout element 300. The first end of the tubular member 310 may be attached to the input adapter 220. For example, the first end of the tubular member 310 may be attached to the second end of the fanout assembly 222 of the input adapter by an epoxy. And/or the second end of the tubular member 310 may be attached to the third fanout element 300. For example, the second end of the tubular member 310 may be attached to the input port of the third fanout element 300 by an epoxy.

In another exemplary embodiment, an optical splitter assembly is provided comprising a housing, an optical splitter element, an input fiber extending from the first input opening to the optical splitter element, and a plurality of output fibers extending from the optical splitter element to at least the plurality of output openings. Moreover, the input fiber and the plurality of output fibers extend through the assembly free of any loops such that the housing and thus the optical splitter assembly is compacted relative to the optical splitter element. For example, the optical splitter assembly may include the fanout elements described herein to provide adequate support of the input and output fibers without requiring the looping of any fibers.

The optical splitter assemblies disclosed herein may be combined with an optical patch panel as part of a fiber distribution hub. The relatively compactness of the optical splitter assemblies may help to modularize a fiber distribution hub and reduce the overall size of the fiber distribution hub.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An assembly comprising:
   a housing defining a first input opening and a plurality of output openings;

an optical splitter element contained within the housing and having a first end and a second end;

an input fiber extending from the first input opening to the first end of the optical splitter element;

a plurality of output fibers extending from the second end of the optical splitter element to the plurality of output openings free of loops, such that the housing is compacted relative to the optical splitter element; and a first fanout element positioned between the optical splitter element and the plurality of output openings defined by the housing, the first fanout element having a plurality of input ports and output ports and defining a plurality of channels extending between the plurality of input ports and output ports, wherein each output fiber of the plurality of output fibers extends into an input port of the first fanout element, along and within a channel of the first fanout element, and beyond an output port of the first fanout element.

2. The assembly according to claim 1 further comprising a second fanout element positioned between the first fanout element and the plurality of output openings defined by the housing, the second fanout element having a plurality of input ports and output ports and defining a plurality of channels extending between the plurality of input ports and output ports, wherein each output fiber of the plurality of output fibers extends into an input port of the second fanout element, along and within a channel of the second fanout element, and beyond an output port of the second fanout element.

3. The assembly according to claim 2 further comprising a third fanout element positioned between the optical splitter element and the input opening defined by the housing, wherein the third fanout element defines a channel between an input port and an output port and the input fiber extends through the input port of the third fanout element, along and within the channel of the third fanout element, and beyond the output port of the third fanout element.

4. The assembly according to claim 3 further comprising a first plurality of tubular members extending from the plurality of output ports of the first fanout element to the plurality of input ports of the second fanout element and wherein each of the plurality of output fibers extend through one of the first plurality of tubular members.

5. The assembly according to claim 4 further comprising a second plurality of tubular members extending from the plurality of output ports of the second fanout element to at least the plurality of output openings defined by the housing and wherein each of the plurality of the output fibers extend through one of the second plurality of tubular members.

6. The assembly according to claim 5 further comprising an epoxy for attaching the first end of each of the first plurality of tubular members to one of the plurality of output ports of the first fanout element and for attaching the first end of each of the second plurality of tubular members to one of the plurality of output ports of the second fanout element.

7. The assembly according to claim 1, wherein the input fiber is fused to the first end of the optical splitter element and each of the plurality of output fibers is fused to the second end of the optical splitter element.

8. The assembly according to claim 1 in combination with an optical patch panel defining a plurality of adapters, and wherein the assembly further comprises a plurality of plugs and wherein each of the plurality of output fibers is attached to one of the plurality of plugs and each plug of the plurality of plugs is compatible with one of the plurality of adapters of the optical patch panel.

9. The assembly according to claim 1, wherein the input fiber extends free of any loops.

10. An assembly comprising:

a housing defining at least a first input opening and a plurality of output openings;

an input adapter in communication with the first input opening of the housing and configured to receive an input optical cable;

an input fiber extending from at least the input adapter to a second end of the input fiber;

an optical splitter element having a first end and a second end, wherein the first end of the optical splitter is in communication with the second end of the input fiber;

a plurality of output fibers, each output fiber extending from a first end of the output fiber in communication with the second end of the optical splitter element to a second end of the output fiber;

a first fanout element having a plurality of input ports and output ports and defining a plurality of channels extending between the plurality of input ports and output ports; wherein each output fiber of the plurality of output fibers extends into an input port of the first fanout element, along and within a channel of the first fanout element, and beyond an output port of the first fanout element;

a first plurality of tubular members, each tubular member extending from a first end at one of the plurality of output ports of the first fanout element to a second end of the tubular member, wherein each output fiber of the plurality of output fibers extends into a first end of a tubular member, along and within the tubular member, and beyond a second end of the tubular member;

a second fanout element having a plurality of input ports and output ports and defining a plurality of channels extending between the plurality of input ports and output ports; wherein the second end of each of the first plurality of tubular members extends to an input port of the second fanout element and each output fiber of the plurality of output fibers extends into an input port of the second fanout element, along and within a channel of the second fanout element, and beyond an output port of the second fanout element; and a second plurality of tubular members, each tubular member extending from a first end at one of the plurality of output ports of the second fanout element to a second end of the tubular member, wherein each output fiber of the plurality of output fibers extends into a first end of a tubular member of the second plurality of tubular members, and along and within the tubular member;

wherein each second end of the plurality of output fibers and each second end of the second plurality of tubular members extend beyond an output opening defined by the housing.

11. The assembly according to claim 10 further comprising a plurality of plugs and wherein each second end of the plurality of output fibers is attached to a plug of the plurality of plugs.

12. The assembly according to claim 11, wherein at least one of the plurality of plugs is a LC-APC plug.

13. The assembly according to claim 10 further comprising a third fanout element positioned between the optical splitter element and the input adapter, wherein the third fanout element defines a channel between an input port and an output port and the input fiber extends through the input port of the third fanout element, along and within the channel of the third fanout element, and beyond the output port of the third fanout element.

14. The assembly according to claim 10 further comprising an epoxy attaching the first end of each of the first plurality of tubular members to one of the plurality of output ports of the first fanout element.

15. The assembly according to claim 10 further comprising an epoxy attaching the first end of each of the second plurality of tubular members to one of the plurality of output ports of the second fanout element.

16. The assembly according to claim 10, wherein the first end of the optical splitter element defines an input port for receiving the second end of the input fiber and the second end of the optical splitter element defines a plurality of output ports for receiving each of the first ends of the plurality of output fibers.

17. The assembly according to claim 10, wherein the second end of the input fiber is fused to the first end of the optical splitter element and each of the first ends of the plurality of output fibers is fused to the second end of the optical splitter element.

18. The assembly according to claim 10, wherein each of the output fibers of the plurality of output fibers extends free of any loops.

19. The assembly according to claim 10 in combination with an optical patch panel defining a plurality of adapters, and wherein the assembly further comprises a plurality of plugs and wherein each second end of the plurality of output fibers is attached to one of the plurality of plugs and each plug of the plurality of plugs is compatible with one of the plurality of adapters of the optical patch panel.

* * * * *